Patented Feb. 21, 1939

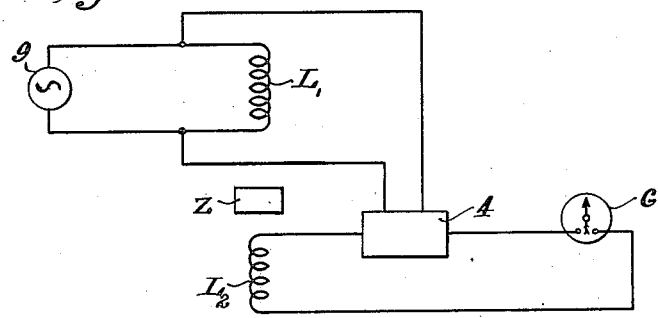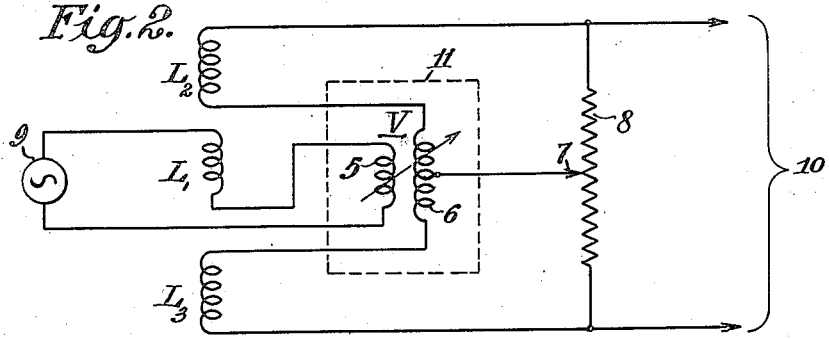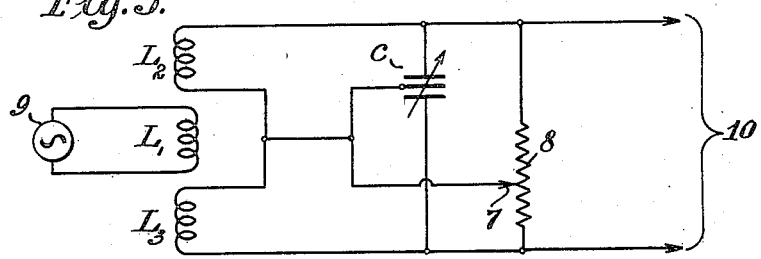

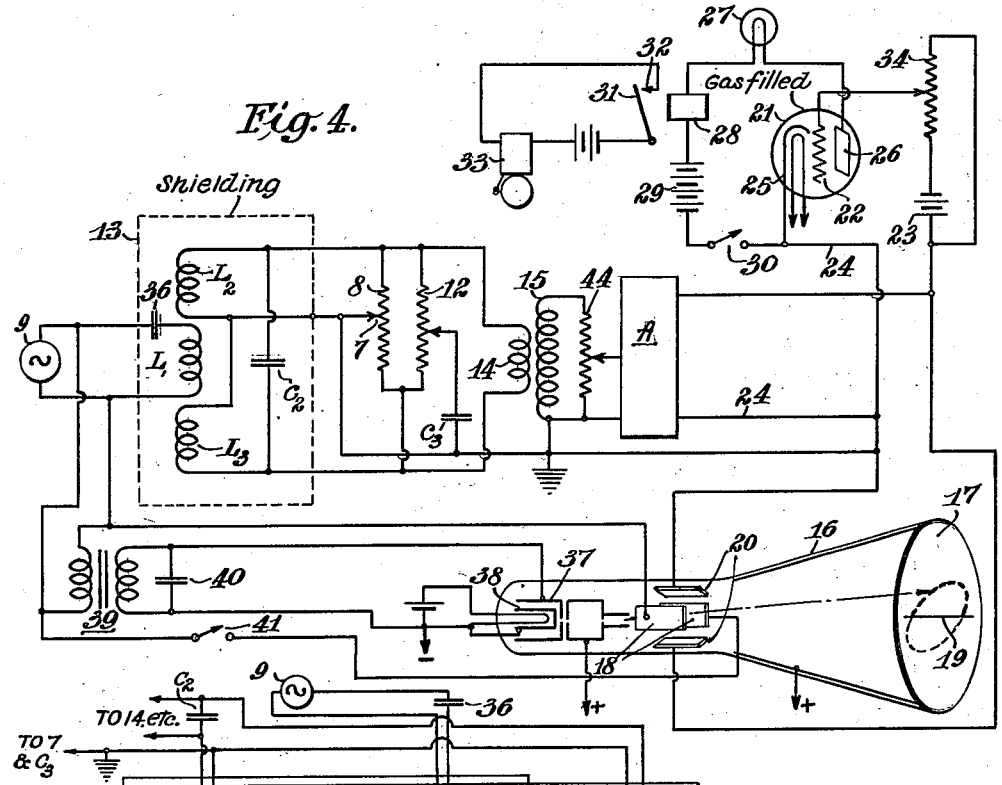
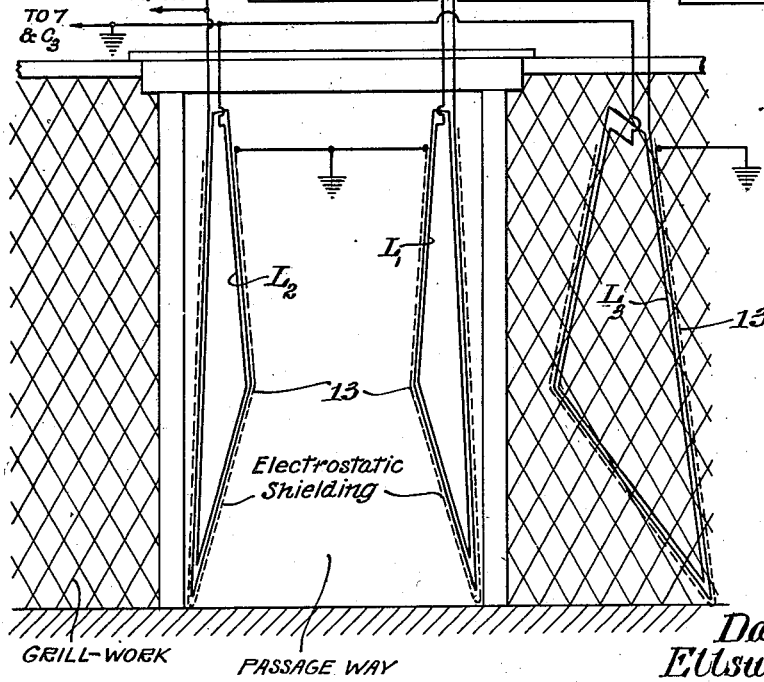

2,147,746

UNITED STATES PATENT OFFICE 2,147,746

SYSTEM FOR BALANCING AN IMPEDANCE NETWORK

David G. C. Luck, Haddon Township, Camden County, and Ellsworth D. Cook, Merchantville, N. J., assignors, by mesne assignments, to Radio Corporation of America, New York, N. Y., a corporation of Delaware Application July 27, 1934, Serial No. 737,152

3 Claims. (Cl. 177—311)

This invention relates to impedance networks, and more particularly to a device for indicating and distinguishing between resistive and reactive components of an alternating electromotive force derived from an impedance network.

In one embodiment of our invention an inductively balanced apparatus is provided whereby the presence of a metallic body may be detected. If it is desired to exclude such a body from a certain region, that region may be protected by setting up an alternating magnetic field therein, then causing an electromotive force to be induced in a secondary coil immersed in said field and deriving an electromotive force in any suitable manner for use in compensating the electromotive force normally induced in the coil. It is preferable to dispose a primary coil producing the field and the aforementioned secondary coil coaxially on opposite sides of the region to be protected. Where magnetic fields from external sources are likely to cause interference with the operation of our apparatus, it is desirable to obtain the balance of electromotive forces by two opposingly connected identical coils placed symmetrically in the magnetic field.

An adjustable compensating means may be provided for balancing the two electromotive forces both in magnitude and phase, when there is no metal in the protected region. Indicating means may then be provided and rendered responsive to an unbalanced condition caused by the introduction of a sufficiently large metallic body into the protected region.

Detection of non-magnetic metals is caused by the magnetic effects of the eddy currents set up in them because of their electrical conductivity, while detection of magnetic metals is caused directly by the effect on the magnetic field of their magnetic permeability. The inductive effects in the two cases are in opposite sense. Therefore, we prefer to use a high frequency alternating current source for the detection of non-magnetic bodies, to emphasize the eddy current effects, or a low frequency source for the detection of magnetic bodies, to suppress the eddy current effects. We have found a source of 60 cycles per second, such as is quite generally available, very satisfactory for the detection of magnetic objects.

Magnetic objects, to be detected, must have appreciable extent in the direction of the magnetic field. In order to detect a long, thin object, carried through the protected region without turning, whatever the direction of its length, the magnetic field shape and the direction of passage of the object are preferably so arranged that field components in every direction are encountered by the object during its passage. We accomplish this partly by passing material to be inspected through the protected region along a direction perpendicular to the common axis of the coils, thus making use of the curvature of the field; and partly by arranging, in addition, that the two coil sides crossed by the inspected material in its passage shall not be parallel. We prefer to use coils of triangular or trapezium shape and with horizontal base. The arrangement may be such that the metallic bodies to be detected will move horizontally when carried concealed on the person of one who walks through the protected region. The same arrangement is desirable, for similar reasons, when our invention is used for the detection of non-magnetic objects.

With respect to the various devices that have been resorted to in the past for detecting the presence of concealed metallic objects, we have found generally that if they are so sensitive as to detect fairly small things, such as belt buckles, pocket knives, and articles of that size, then it was difficult to shield the apparatus from an unbalancing influence having its source external to the protected zone. We found it necessary to abandon, for our purposes, the use of electrostatic means for unbalancing our compensated circuits when an article to be detected was brought into the protected zone. The reason for this is that a non-metallic body of certain size might create an unbalance as readily as a smaller metallic body which alone was to be detected.

It is an object of our invention to provide sensitive means for indicating and distinguishing between resistive and reactive components of an alternating electromotive force derived from an impedance network.

Other objects of our invention are: to improve the sensitivity and utility of an inductively influenced detector of metallic bodies; to provide apparatus for detecting an attempt to smuggle dangerous weapons and the like into a prison, a bank, or other place where the carrying of the same by unauthorized persons is prohibited; and to provide a protective system responsive to the presence of metallic objects carried on the person of anyone entering through a passageway such that a measure of discrimination may be had with regard to the size of such objects and whether they are made of magnetic or non-magnetic material.

Our invention may take a variety of forms, depending upon the use to which it will be put. If, for example, it is desired to prevent the smuggling of dangerous weapons into a prison or bank, it is then preferable to utilize induction coils of considerable size, one being a primary coil which may be disposed on one side of a passageway, one of two secondary coils being disposed on the opposite side of said passageway and a second identical secondary coil disposed in inductive relation to the primary coil in a region where it will normally derive from the primary coil an induced electromotive force equal and opposite to that of the secondary coil first mentioned. With such an arrangement of primary and secondary coils and the use of further balancing means, together with an amplifier and telltale device, it is possible to detect the presence of a metallic body commensurate in size with that of a dangerous weapon. Such a body when brought into an alternating magnetic field between the primary and one of the secondary coils may be caused to upset the balanced relation between the two secondary coils and thus to actuate an indicator or alarm of any suitable type, preferably a cathode ray tube; an audible or visual annunciator controlled by an electronic relay; or both.

For a complete understanding of our invention reference is made to the following specification and to the accompanying drawings forming a part thereof, in which Figure 1 is a schematic diagram illustrating a principle involved in the balancing of inductive circuits such as may be utilized in our invention, Fig. 2 is another schematic diagram illustrating a modified arrangement for balancing the currents in two secondary coils which may be opposingly influenced by a primary coil, Fig. 3 shows diagrammatically still another modification, Fig. 4 is a more complete circuit diagram illustrating an arrangement for setting up an inductive and a resistive balance between two secondary coils in relation to a primary coil, and illustrating further means for achieving the object of detecting an unbalanced condition, and Fig. 5 is a perspective view of a part of our improved protective system including three induction coils, two of which are suitably disposed on opposite sides of a passageway through which anyone may walk while carrying concealed metallic objects.

Referring to Fig. 1, we have illustrated how an inductive balance may be obtained if two coaxial coils $L_1$ and $L_2$ are respectively placed on opposite sides of a zone Z to be protected. The primary $L_1$ is energized from any suitable source of alternating current 9. The magnetic field set up in the zone Z by the coil $L_1$ causes an electromotive force to be induced in the coil $L_2$ which may be compensated in any suitable manner by a device 4 placed in circuit with the coil $L_2$. The device 4 is also energized from the source 9 and includes means for adjusting both the phase and the amplitude of the electromotive force opposed to that which is induced in the coil $L_2$. Hence a balance will be shown by the indicating instrument G until disturbed by a change in the field, as when influenced by the presence of metal therein.

Fig. 2 shows schematically an arrangement comprising a primary inductance $L_1$ with which the secondary inductances $L_2$ and $L_3$ are coupled in substantially balanced relationship. Assuming that these induction coils are of considerable size, such as shown in Fig. 5, then it is preferable that further means for refining the balancing adjustments should be provided. Such means are represented in this case by the variable mutual inductance or variometer V having a primary coil 5 in series with the primary $L_1$, and a secondary coil 6 in series with the secondary coils $L_2$ and $L_3$. The coil 6 has a mid-tap connected with an adjustable arm 7 on a potentiometer 8 which shunts the two secondary coils $L_2$ and $L_3$. The primary circuit may be fed from any suitable source of alternating current 9 causing a current flow across the output leads 10 only when a condition of unbalance exists. It will be apparent that the input and output circuits may be reversed, if desired. That is to say, the source of energy may be applied to the leads 10 while the device 9 is replaced by a load.

An embodiment of our invention according to Fig. 2 has been found to be satisfactory in operation and appears to present the one inconvenience that if very large induction coils $L_1$, $L_2$, and $L_3$ are used, as shown in Fig. 5 then, for the purpose of balancing the same, it appears to be essential that the variometer V should be of considerable size. It was also found to be important that the variometer V be well shielded, as represented by the electrostatic shield 11.

In the embodiment of our invention which is schematically represented in Fig. 3, it will be seen that a capacitor C has been substituted for the variometer in Fig. 2. In this case all balancing adjustments are effected in the secondary network. The remaining portion of the network shown in Fig. 3 will be understood from the foregoing description of Fig. 2. In the operation of this embodiment of our invention no difficulty was encountered except that the variable capacitor C had to be of very large proportions for balancing out 60 cycles, which was the frequency chosen for tests.

Referring now to Fig. 4, we show an arrangement which will be seen to constitute still another embodiment of our invention wherein a fixed capacitor $C_3$ in series with a variable resistor 12 is employed in place of the variable capacitor C of Fig. 3. Alternating current is derived from the source 9. The coil $L_1$ and the capacitor 36 are preferably series-connected and are tuned to the operating frequency. The potentiometers 8 and 12 may, if desired, be disposed at a point remote from the large induction coils $L_1$, $L_2$ and $L_3$. Electrostatic shielding 13 is provided for all portions of the balanced circuit so as to prevent unnecessary variables from influencing the balanced condition.

If an unbalanced condition occurs, it will be seen that a current will be caused to traverse the primary coil 14 of an impedance matching transformer, the secondary 15 of which connects with an amplifier A of any suitable type. The output energy may be considerably increased before amplification by providing a capacitor $C_2$ in shunt with the secondary coils $L_2$ and $L_3$ such that a tank circuit exists which is resonant to the operating frequency.

To take full advantage of the tuning of the secondaries, these coils should have a large ratio of reactance to resistance at the operating frequency.

The disturbance produced by interfering magnetic fields sets a limit to the smallness of the object which may be detected. The limiting sensitivity of the apparatus may, therefore, be increased by increasing the energy stored in the field produced by the primary coil $L_1$. It will be seen, therefore, that it is advantageous to provide a resonant condition at the operating frequency in the circuit of the primary coil $L_1$. Furthermore, the large coil $L_1$ should have a high ratio of reactance to resistance at the operating frequency. By this arrangement it is possible to suppress, for the most part, interference caused by the presence of magnetic fields set up from outside sources.

The sensitivity of our detector may also be made adjustable by controlling the gain in the amplifier A, as by means of the potentiometer 44. Thus a concealed weapon carried by a person may, for example, be distinguished from a few coins or a spectacle-case carried in his pocket; an arch support in his shoe, or, possibly, a belt buckle, all of which it might be of no interest to detect.

For detecting the output energy from the amplifier A, we preferably employ either or both of two alarm or annunciator systems. One of these systems may comprise a cathode-ray tube 16 having the usual electrodes for projecting electrons upon a fluorescent screen 17 whereon the area of impact is caused to be illuminated. One of the deflecting circuits for this cathode ray tube may comprise electrostatic plates 18 which are energized from the source 9 which also feeds the primary induction coil $L_1$. The deflection due to the influence of the plates 18, if no other deflection is present, should be such as to display a straight line 19 on the fluorescent screen of the cathode-ray tube. If, however, currents are induced disproportionately in the secondary coils $L_2$ and $L_3$ then the difference of potentials thereof induced in the output transformer 14—15, and then amplified, may be impressed upon a deflecting circuit, which in this case is represented as electrostatic plates 20 in the cathode-ray tube. It will be readily understood by those skilled in the art that either or both of the deflecting circuits of the cathode-ray tube may be caused to operate magnetically or electrostatically, as preferred.

The effect of an unbalanced condition in the coils $L_2$ and $L_3$ may be indicated by distortion of the electron beam pattern as projected against the fluorescent screen 17. Due to the phase relation between the primary coil $L_1$ and the secondary coils $L_2$—$L_3$, the beam deflection in the cathode ray tube will, in general, be such as to produce an elliptical pattern the axis of which will lie obliquely with respect to the line 19 as produced under the condition of balance.

In order that the potentiometers 8 and 12 may be readily adjusted to provide a balanced condition in the secondary coils $L_2$ and $L_3$, notwithstanding the presence of nearby stationary magnetic objects which would unequally influence the fields traversing these two coils, we preferably make use of grid modulation in the cathode ray tube 16. The grid 37 of this tube is connected to the cathode 38, preferably through the secondary winding of a transformer 39. The primary of this transformer is energized from the source 9. When the grid is thus modulated, vertical deflection due either to resistive or reactive components of unbalance may be neutralized by observing whether the spot projected upon the screen 17 is more intensely illuminated on the upper or the lower side of the line 19, the latter representing the path of the cathode ray when conditions are perfectly balanced. The one-sided intensification of the light spot on the screen enables one to determine the direction of rotation of said spot in its elliptical path. The operator who must adjust the apparatus to bring about a perfect balance is thus enabled to set the controls for potentiometers 8 and 12 always in a direction for improving the balance rather than the reverse. He does not, of course, wish to set off the alarm hereinafter described by adjustment in the wrong direction. If, therefore, the illumination is more intense above the horizontal line 19, it is known that the control for potentiometer 8 should be moved in one direction, whereas, if the more intense illumination is below the line 19, this control should be moved in the opposite direction in order to effect a perfect balance. The potentiometer 8 is used primarily to adjust for the resistive component of the unbalance as indicated by the degree of ellipticity, whereas the potentiometer 12 adjusts the reactive component as indicated by the slope of the elliptical axis.

The procedure, therefore, in adjusting to a balance is simply this,—to first adjust the potentiometer 8 until the elliptical pattern is collapsed to a straight line and then to adjust the potentiometer 12 until no deflection at right angles to the timing deflection is produced. A further check upon the accuracy of these adjustments is provided by the opening of the switch 41 to remove the timing deflection. The balance is then indicated by collapse of the linear pattern to a single spot.

The simplicity of the steps described in the foregoing paragraph for obtaining balance in an impedance bridge will be appreciated by those who have attempted by means heretofore available to accomplish the same results.

For complete separation of the effects of the two balancing controls upon the shape of the pattern traced by the cathode ray upon the screen 17 it is necessary that a vertical deflection due either to resistive or reactive components be accurately in phase with the timing of the horizontal deflection derived from the source 9. The necessary phase relations may be obtained by suitable elements (not shown) in the circuits which feed the electrostatic plates 18. Likewise suitable phasing of the modulation impressed upon the grid 37 must be obtained, as is well understood by those skilled in the art. The voltage applied to the grid should be 90° out of phase with the voltage supplied to the deflecting circuit including electrostatic plates 18. This may be accomplished by placing a capacitor 40 of suitable value in shunt with the secondary of the transformer 39.

A second portion of our alarm system may comprise, for example, a gas-filled electron tube 21 having the usual cathode 25, control grid 22 and anode 26. As shown in Fig. 4, we connect the control grid 22 through a C-battery 23 to one of the output leads from the amplifier A. The other output lead 24 is connected to the cathode 25. The output circuit for the tube 21 may comprise its anode 26, a signal lamp 27, a relay 28, a battery 29 and a manually operable switch 30 which connects back to the cathode 25. Relay 28 has an armature 31 which is adapted to close a circuit with its front contact 32 when relay 28 is energized, thereby to sound a gong 33 or any other suitable alarm device or annunciator.

In the operation of this portion of our alarm system it will be seen that when the gas-filled tube 21 is triggered off by energy from the amplifier A, it will continue to produce an electron discharge such as to afford a low impedance in the output circuit of the tube whereby the relay 28 may be actuated and the lamp 27 may be lit. Thus, both the lighting of the lamp 27 and the ringing of the gong 33 may be caused to indicate the presence of an unbalanced condition of any suitable value such as may be determined by adjustment with respect to the sensitivity of our apparatus. To obtain a suitable adjustment in this respect, the bias on the grid 22 may be varied, as by means of a potentiometer 34. After making a given installation, tests can readily be made to observe and correct for the effects of metallic objects of inferior sizes and kinds so that, if desired, the gas-filled tube 21 will not trigger off unless an object of alarming size is brought into the field of the induction coils.

It is desirable in many instances that both the cathode-ray tube indicator 16 and the gas-filled tube 21 with its annunciators be employed in conjunction with one another. The cathode-ray tube may serve for distinguishing between the influence of a small and perhaps harmless object carried on a person and a larger object which might be questionable. The visual and audible alarms under the control of the gas-filled tube 21 will respond, however, only to objects of such size as to be considered dangerous. When an alarm of this sort has been given, it may, of course, be interrupted by manually opening the switch 30.

While it is preferable in most instances to supply direct current in the output circuit of the tube 21 so as to render the alarm persistent until the switch 30 is opened, the battery 29 may, if desired, be replaced by a source of alternating current, in which case no switch 30 would be necessary because the alarm would cease as soon as the unbalancing influence of the metallic body was removed.

In Fig. 5 we have illustrated, by way of example, how the induction coils L₁, L₂, L₃ may be disposed with respect to one another, the coils L₂ and L₃ being placed respectively on opposite sides of a passageway through which it may be desired to admit persons who are presumed to have business within the confines of, say, a prison or a bank, or any other place to be protected by means of our apparatus.

If the primary coil L₁ is disposed, say, on the right hand side of the passageway, then, still further to the right, according to our invention, it will be necessary to place the secondary coil L₃. The coil L₁ will be as nearly as possible equidistant from the coils L₂ and L₃. The three coils will also be coaxially mounted and will preferably be as nearly as possible of uniform size. Suitable electrostatic shielding 13 is highly desirable to prevent any undue disturbance in the system such as might be occasioned by the presence of nearby stationary objects of any kind and of non-metallic objects within the field set up by the primary induction coil L₁. This shielding 13 surrounds the convolutions of wire in the coils and is, of course, grounded. Due precaution is also made against forming the shield into a closed conductive loop such as would constitute a short-circuited secondary.

It has been found that the field produced by a rectangular coil will not detect certain objects if they are held in a particular relation to the magnetic field. For example, a long, slender, metallic object, when held in a perpendicular position, may be passed through the magnetic field without upsetting the balance. The solution to this problem was found by making the coils of irregular shape, like a trapezoid or triangle. The result is that the direction of the strongest components of the magnetic field changes throughout the distance traversed by the object. An object which is held in a fixed position will therefore intercept the flux lines at some point within the area, and will consequently be indicated.

Although we have illustrated and described herein certain specific embodiments of our invention, we are fully aware that many other modifications may be made and we do not intend to be limited except insofar as is necessitated by prior art and as indicated by the following claims.

We claim as our invention:

1. In a device of the class described, a network adapted for setting up therein electromotive forces, a source of alternating current for energizing said network, means connected to said network for normally balancing the resistive component of said forces, means connected to said network for balancing the reactive component of said forces, and a cathode ray tube connected to said network and including a cathode ray under control of said forces when they become unbalanced for indicating the amplitude thereof, and for indicating the phase displacement thereof relative to said source of alternating current.

2. In a device of the class described, a reactive network, a source of alternating current for setting up electromotive forces in said network, means connected to said network for balancing the reactive components of said forces, separate means connected to said network for balancing the resistive components of said forces, a cathode-ray oscillograph connected to said network and having timing means therein adapted to deflect an electron beam in one coordinate synchronously with said alternating current, further beam deflecting means responsive to an unbalanced condition in said network and beam-intensity modulating means operable substantially in quadrature phase relation to the deflection produced by said timing means.

3. In an apparatus for detecting the presence of a metallic object moving in a passageway, a primary coil and a pair of secondary coils, a source of alternating current for energizing said primary coil, said secondary coils being substantially coaxial to and equi-distant from said primary coil, said passageway being positioned between said primary coil and one of said secondary coils and intercepting the axis of said coils, at least said primary coil having an irregular form whereby the direction of the flux lines varies at different points on a straight horizontal line through said passageway, means for balancing the electromotive forces induced in said pair of coils, and means for detecting an unbalancing of said electromotive forces.

DAVID G. C. LUCK.
ELLSWORTH D. COOK.